United States Patent [19]

Karoutas

[11] Patent Number: 5,283,821
[45] Date of Patent: Feb. 1, 1994

[54] SPLIT-CONE SPACER GRID

[75] Inventor: Zeses E. Karoutas, Simsbury, Conn.

[73] Assignee: Combustion Engineering, Inc., Windsor, Conn.

[21] Appl. No.: 905,629

[22] Filed: Jun. 29, 1992

[51] Int. Cl.[5] .............................................. G21C 3/34
[52] U.S. Cl. .................................. 376/439; 376/438; 376/442
[58] Field of Search ............... 376/439, 451, 442, 462, 376/438, 448; 976/DIG. 60, DIG. 78, DIG. 71

[56] References Cited

U.S. PATENT DOCUMENTS

| | | | |
|---|---|---|---|
| 3,395,077 | 7/1968 | Long Sun Tong et al. | 376/439 |
| 3,663,367 | 5/1972 | Calvin | 376/439 |
| 3,764,470 | 10/1973 | Calvin | 376/439 |
| 3,814,666 | 6/1974 | Calvin | 376/439 |
| 3,844,888 | 10/1974 | Calvin | 376/439 |
| 3,862,000 | 1/1975 | Pugh et al. | 376/439 |
| 3,933,584 | 1/1976 | Litt | 376/439 |
| 4,692,302 | 9/1987 | DeMario et al. | 376/439 |
| 4,725,403 | 2/1988 | Buettiker | 376/439 |
| 4,879,090 | 11/1989 | Perrotti | 376/442 |

Primary Examiner—Donald P. Walsh
Assistant Examiner—Meena Chellian
Attorney, Agent, or Firm—L. James Ristas; John H. Mulholland

[57] ABSTRACT

A flow deflector grid (10) for a nuclear fuel assembly, comprising a plurality of metal strips (12,14) which intersect in a regular array to form an egg-crate type lattice, which defines a plurality of coolant flow channels (16). Each channel has sidewalls (42,44) defined by the strips, a height dimension defined by the height of the strips, a plurality of corners (46) defined by the strip intersections (26), a channel central axis parallel to the height dimension, and a flow cross section normal to the channel axis for coaxially receiving a fuel rod (18) spaced within the channel sidewalls. A unitary flow deflector member (30) is attached to and situated in the corner of each channel so as to be cradled between first and second sidewalls. The deflector member has a hood portion which projects above the height dimension of the channel and which includes a substantially planar vane (66) extending obliquely upward from the first sidewall and oriented transversely to the channel axis, and a substantially planar flow containment wall (48) extending substantially vertically from the second sidewall to the vane. The deflector member also includes a lower, angled bracing portion (50,52) having a height substantially equal to the height dimension of the channel and being attached to and cradled in the corner of the channel, with the hood portion integrally projecting above the bracing portion.

12 Claims, 4 Drawing Sheets

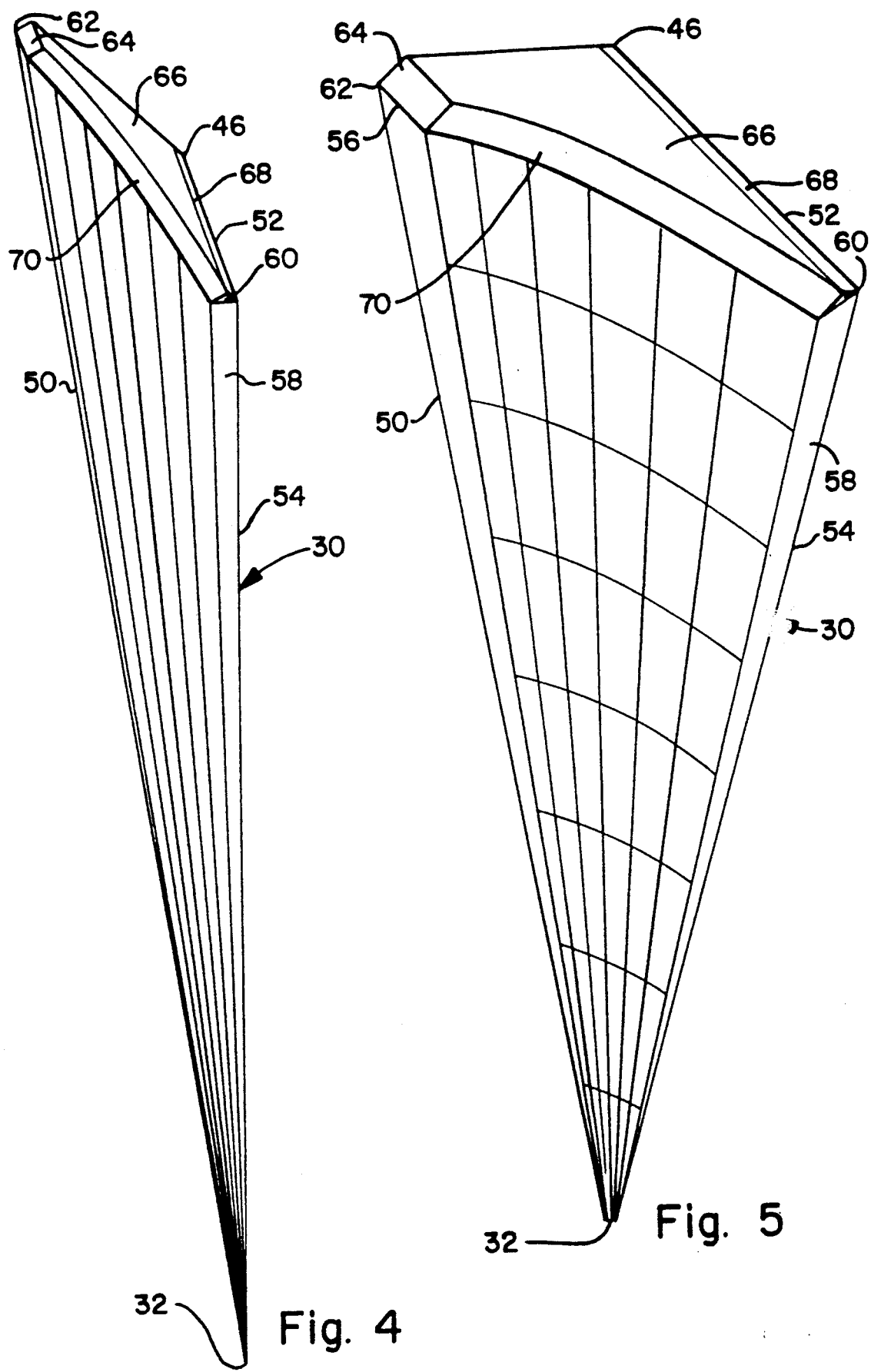

SPLIT-CONE SPACER GRID

BACKGROUND OF THE INVENTION

The present invention relates to light water nuclear fuel assemblies, and more particularly, to nuclear fuel assembly grids which carry structure for deflecting coolant flow.

Nuclear reactor engineers have for many years recognized the advantage of thoroughly mixing the reactor coolant within and between flow channels associated with each fuel rod in a light water nuclear reactor fuel assembly. It is a simple matter to provide flow deflecting structure on the fuel assembly grids, but a number of other considerations must be taken into account in order to arrive at a satisfactory design. These other considerations include the increased pressure drop resulting from the added flow resistance due to the presence of deflector structure, and the added parasitic neutron absorption by the deflector structure, which can affect achievable power levels, cycle burnup, and local power distribution.

U.S. Pat. No. 4,879,090, "Split-Vaned Nuclear Fuel Assembly Grid," issued November 7, 1989, discloses a refinement to a basic deflector concept which has been known for decades. The basic concept is to provide vanes or tabs that are integrally formed on the upper edges of the interlaced strips of a grid, and bent over into the flow channel so as to deflect the upwardly flowing coolant. In the '090 patent, each channel is shown as having two or three vanes associated therewith. The vanes are initially formed in pairs with a slit and recess between them, such that each member of the pair can be bent in an opposite direction. A weld nugget is formed in the recess between the vanes, for joining the strips which intersect each other through the slit between the vanes.

One disadvantage of this type of flow deflecting vane, is that the cantilevered orientation permits considerable leakage laterally, thereby reducing the amount of flow that can be deflected in the intended direction. Secondly, during reconstitution of fuel assemblies, such vanes are easily deformed by a misaligned fuel rod, necessitating repair or fabrication delay.

Another relatively old concept is described in U.S. Pat. Nos. 3,814,666, "Staggered Cone Deflectors," issued Jun. 4, 1974; 3,844,888, "Helical Flow Deflector Cone For Fuel Element Assemblies," issued Oct. 29, 1974; and 3,663,367, "Flow Deflector For Nuclear Fuel Element Assemblies," issued May 16, 1972 and reissued Mar. 11, 1975 as Re.28,362. The concept underlying these patents, is to provide a generally conical flow deflecting structure at the intersection of the grid strips, with the apex of the cone at the upstream end of the grid, such that the increasing cross-sectional area presented by the cone to the flow, produces lateral flow deflection. The flow through the grid adjacent a particular fuel rod, is deflected back toward the same fuel rod. Although the solid inverted cone such as described in U.S. Pat. No. 3,663,367 and its reissue, proved very effective in certain flow regimes, the grid pressure drop was in most cases excessive. The cone deflectors are more robust than the split vanes or tabs of the type described in U.S. Pat. No. 4,879,090, but the cones do not impart a swirling flow pattern to the coolant. A swirl pattern is desirable because it helps reduce the peak to average hot channel factor.

SUMMARY OF THE INVENTION

It is an object of the present invention to provide an improved nuclear fuel grid and nuclear fuel assembly, in which flow-deflecting structure on the grid produces coolane mixing between adjacent channels and swirling flow around the rods within the channels, while being sufficiently robust to withstand fuel rod reconstitution. The invention should also produce only modest increases in pressure drop and parasitic neutron absorption relative to a grid that does not have flow deflecting structure.

This object is achieved by providing a flow deflector grid for a nuclear fuel assembly, comprising a plurality of metal strips which intersect in a regular array to form an egg-crate type lattice, which defines a plurality of coolant flow channels. Each channel has sidewalls defined by the strips, a height dimension defined by the height of the strips, a plurality of corners defined by the strip intersections, a channel central axis parallel to the height dimension, and a flow cross section normal to the channel axis for coaxially receiving a fuel rod spaced within the channel sidewalls. A unitary flow deflector member is attached to and situated in the corner of each channel so as to be cradled between first and second sidewalls. The deflector member has a hood portion which projects above the height dimension of the channel and which includes a substantially planar vane extending obliquely upward from the first sidewall and oriented transversely to the channel axis, and a substantially planar flow containment wall extending substantially vertically from the second sidewall to the vane. The deflector member also includes a lower, angled bracing portion having a height substantially equal to the height dimension of the channel and being attached to and cradled in the corner of the channel, with the hood portion integrally projecting above the bracing portion.

The present invention exhibits advantages of both the split vanes and inverted cone deflector structure described in the prior patents mentioned above. The deflecting structure of the present invention can be considered as split cones, for replacing the split vanes of U.S. Pat. No. 4,879,090. The "cones" of the present invention, are oriented and shaped somewhat like the split vanes from the top and isometric views, but only two of the split cones are provided per channel, instead of the three or four that were conventionally provided in the prior art. This significantly reduces the incremental pressure drop associated with the flow deflecting structure, relative to the regular grids. Each split cone segment extends from the upstream point of intersection of the grid strips, for a vertical dimension greater than the grid strip height.

The two segments at each grid intersection can be laser welded at five locations on top of the grid and one location at the grid bottom, to facilitate fabrication and to help strengthen the strip by acting as a corner bracket.

BRIEF DESCRIPTION OF THE DRAWINGS

These and other objects and advantages of the invention will be described below with reference to the preferred embodiment, and the accompanying figures, in which:

FIG. 4 is an elevation view of the deflector member of the present invention, taken along arrow 4 in FIG. 3;

FIG. 5 is an elevation view of the deflector member of the present invention, taken along arrow 5 in FIG. 3;

DESCRIPTION OF THE PREFERRED EMBODIMENT

Figure 1:
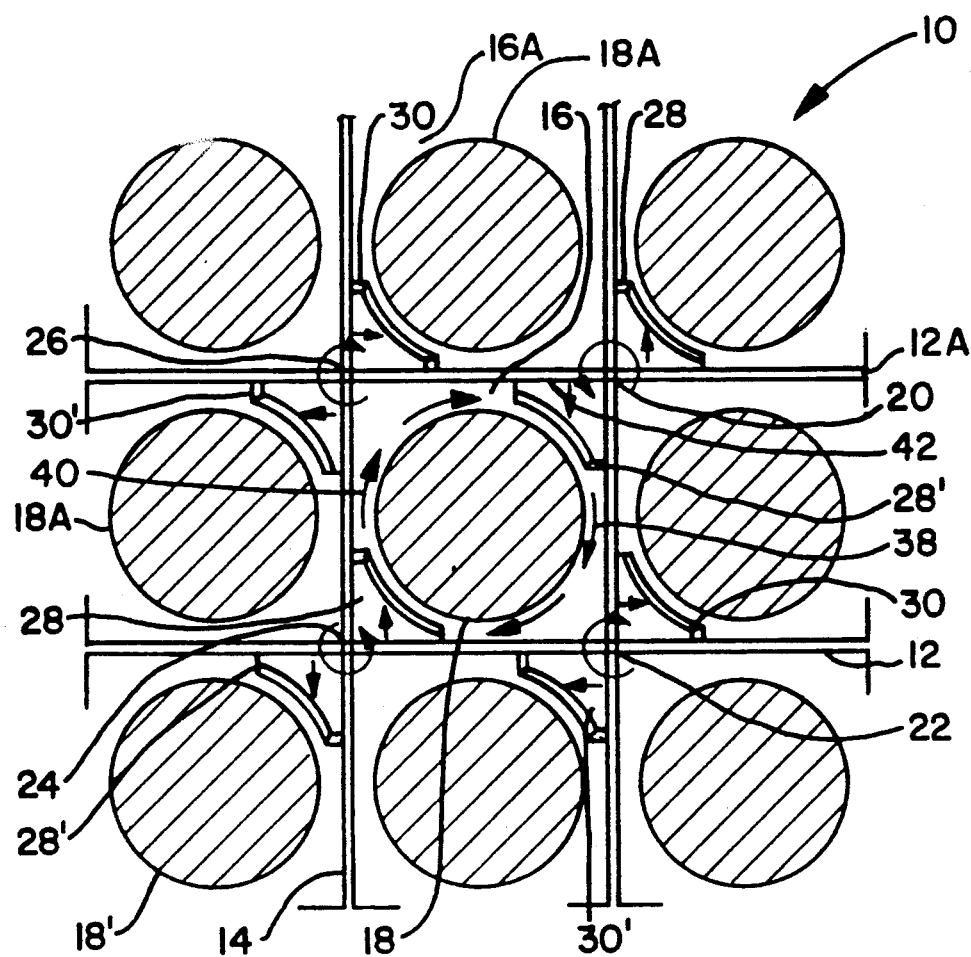
FIG. 1 is a plan view of a portion of a nuclear fuel assembly, looking downward at the upper end of a grid in accordance with the present invention.

FIG. 1 shows, in plan view, a portion 10 of a light water nuclear reactor fuel assembly in accordance with the present invention. The grid 10 is constructed from a plurality of metal strips 12,14, which intersect in a regular array to form an egg-crate type lattice. The lattice defines a plurality of coolant flow cells or channels 16, in which a respective plurality of cylindrical fuel rods 18 traverse the channel in spaced relationship within the side walls of the strips which define the channels. The general construction of the interlaced strips is similar to that described in U.S. Pat. No. 4,879,090, issued Nov. 7, 1989, for a "Split Vaned Nuclear Fuel Assembly Grid," the disclosure of which is hereby incorporated by reference. The '090 patent shows in greater detail, the means, such as cantilevered springs and arches or hard stops, projecting from the side walls for resiliently centering and supporting a fuel rod coaxially in each channel.

Figure 2:
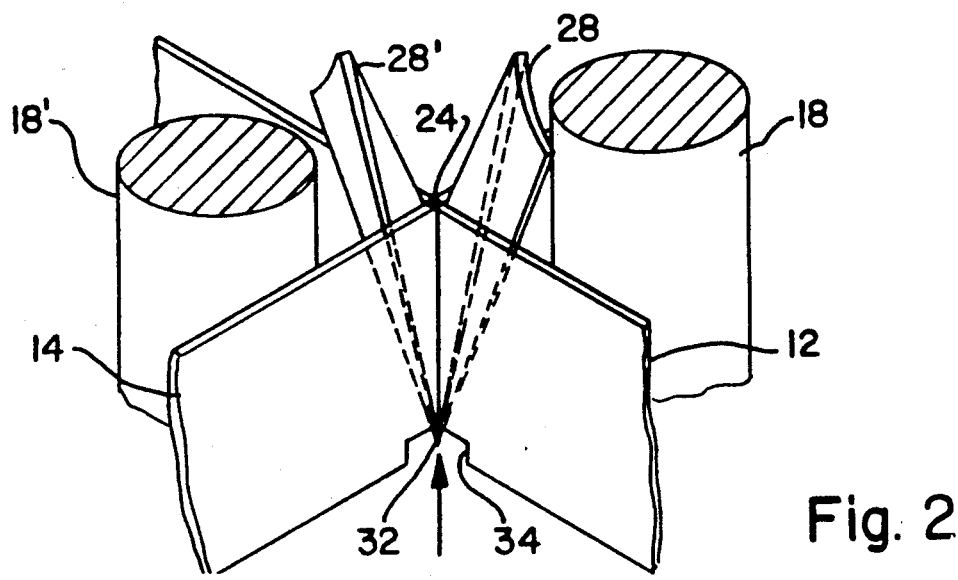
FIG. 2 is an enlarged isometric view of the region at the intersection of two grid strips, where split cones in accordance with the present invention are located.

In the embodiment of FIG. 1, each flow channel is defined by four side walls, and a respective four right-angle corners, thereby defining a flow channel of square cross section. As shown in FIG. 2, the strips 12, which can be considered as running in the eastwest direction, and strips 14, which can be considered as running in the northsouth direction, have substantially the same height (which is large relative to the grid thickness dimension). For convenient reference, each cell such as 16 shown in FIG. 1, can be considered as having a north east corner 20, a south east corner 22, a southwest corner 24, and a northwest corner 26.

In accordance with the invention, a unitary flow deflector member 28 is situated in at least one corner 24 of each channel, so as to be craddled between first and second side walls. The deflector member has a hood portion 66 which projects above the height dimension of the channel, for deflecting the flow laterally of the channel axis. Preferably, one unitary flow deflector member 281 is attached to and situated in the northeast corner 20 defined by consecutive first and second side walls of a given channel 16, and another unitary flow deflector member 28 is attached to and situated in the southwest corner 24 defined by consecutive third and fourth side walls. The deflector member 28 in the northeast corner directs flow in the north to south direction 38, and the flow deflector member in the southwest corner, directs flow in the south to north direction 40.

As can be seen in FIGS. 1 and 2, substantially each of the deflector members 28' in the northeast corners of the channels shares a strip intersection 24 with a deflector member 28 at the southwest corner of a diagonally adjacent channel. More generally, a particular channel 16 has four diagonally neighboring, identical channels to the northeast, southeast, southwest, and northwest. The nearest neighbor cells 16A to cells 16, have deflectors or split vanes 30,30' which direct flow from west to east, and from east to west, respectively, around fuel rods 18A. The other channels along the diagonals of cell 16A, are identical to channel 16A. The overall effect provides alternating clockwise and counter clockwise swirls, which reinforce each other above the cell boundaries such as wall 42.

FIGS. 2-5 illustrate the preferred features of the deflector member, such as 30 shown in FIG. 1. Eastwest side wall 42 and northsouth side wall 44 form a corner at 46 into which the deflector member 30 fits snugly. The deflector 30 has a bracing wall 50 that abuts side wall 42, and bracing wall 52, which is orthogonal to wall 50 and abuts side wall 44. The two bracing walls 50,52 establish a bracing portion of the deflector member by which the member is connected to the side walls. As shown in FIG. 4, the bracing walls preferably taper toward a common apex 32. The apex 32 can be welded easily to the upstream end of the strip intersection. Preferably, as shown in FIG. 2, deflector members such as 28, 28' (or 30,30') are provided back-to-back at a common corner, such that the apex portions of both members 28,28' can be secured together with a common weld at notch 34. Similarly, in the back-to-back configuration, a common weld can be made at the downstream end of the intersection as at 26 in FIG. 3.

Figure 3:
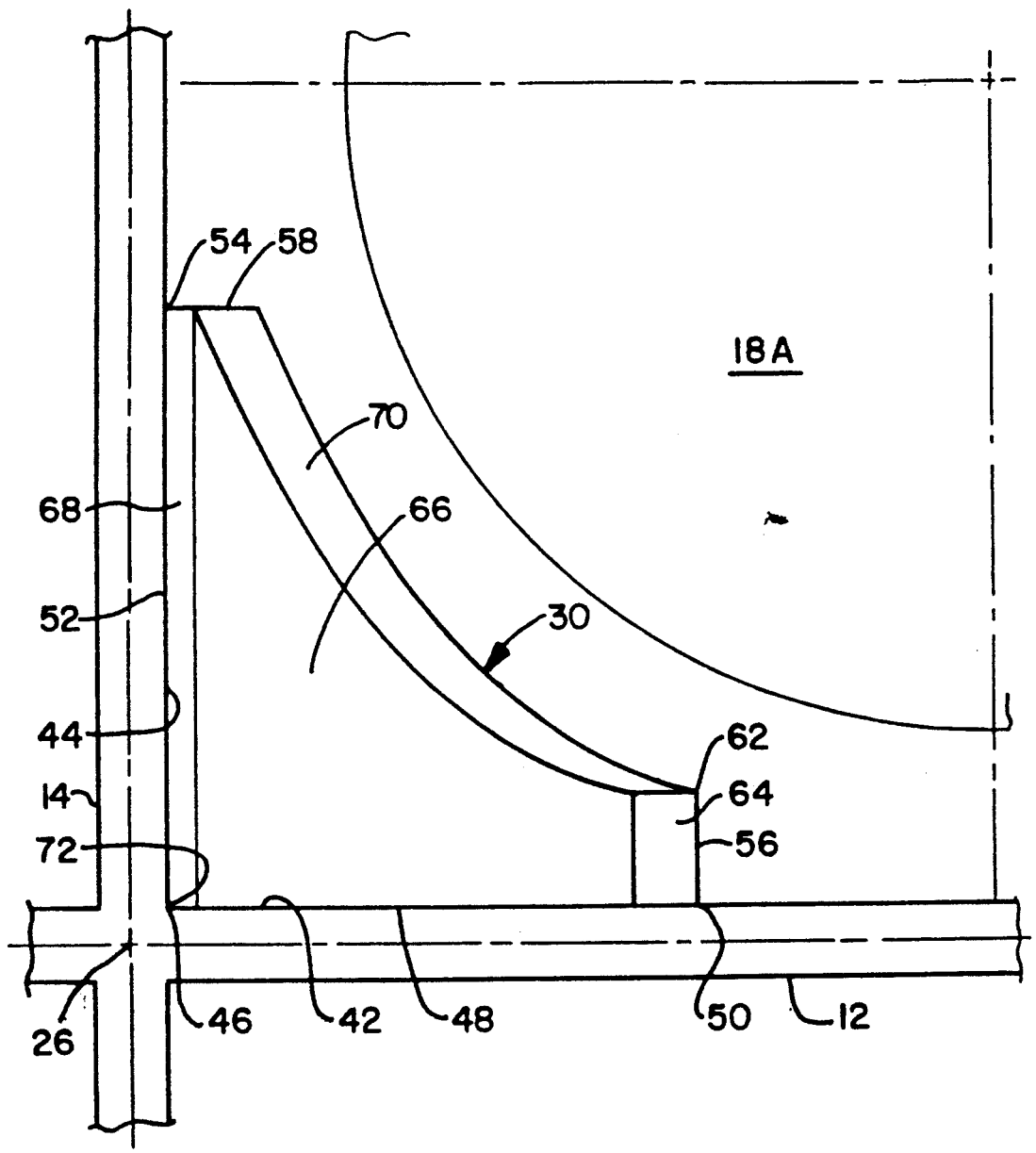
FIG. 3 is an enlarged plan view of a strip intersection with split cone and adjacent fuel rod in accordance with the invention.

Bracing wall 52 extends vertically along side wall 44, substantially only along the height dimension of the strip. Near the top of the strip, a vane portion 66 extends obliquely upwardly from side wall 44, and is oriented obliquely to the channel axis. As shown in FIG. 3, the vane rises above the channel to a peak at 62. The region parallel to side wall 44 at the base 68 of the vane 66, can be somewhat thickened or otherwise shaped to provide a rigid foundation for the cantilevered portion of the vane 66.

Figure 6:
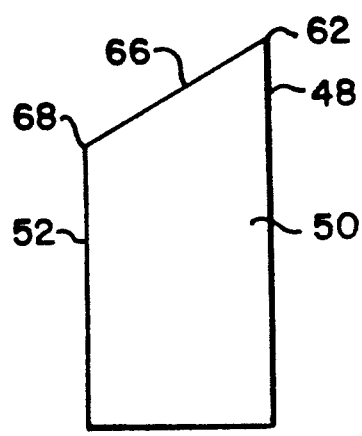
FIG. 6 is an elevation view of a basic version of the deflector member, showing the bracing portion that abuts a side wall of the channel.
Figure 7:
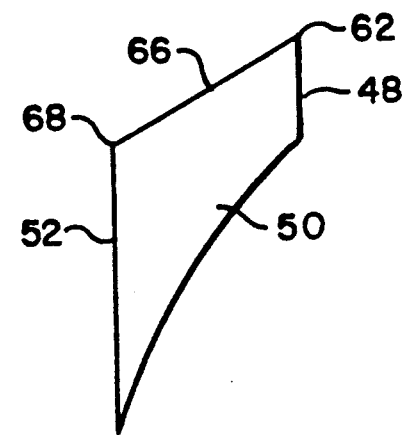
FIG. 7 is an elevation view similar to FIG. 6, showing the preferred form of the deflector member, wherein the bracing portion which abuts the channel side wall, includes a point at the upstream end and an increasingly tapered wall portion in the direction of coolant flow.

FIG. 6 shows a generalized form of the deflector member 30 as would be seen when viewed from the side wall 42. Although a substantially rectangular bracing wall 50 can be provided, the embodiment of FIG. 7 is preferred, wherein the bracing wall has an arcuate, increasing taper from the lower apex 32 up to the vane portion 66. FIGS. 6 and 7 also illustrate that on the side of the deflector member which has the peak 62 of the vane, a containment wall 48, preferably as an integral extension of the bracing wall 50, forms a hood with vane 66 to prevent leakage of coolant in the southerly direction as viewed in FIG. 1 and 3. In other words, as the water rises through the plane of the paper in FIG. 3, it is deflected generally towards the southeast, but by the time the water exits the hood at the peak 62, it is travelling eastwardly, with substantially no southernly directed component, due to the presence of the containment wall 48.

It should be appreciated that as described herein, the inside surface of containment wall 48 is a vertical extension of the bracing wall 50. This is not necessary, however, in that the inside surface of the hood encountered by the rising coolant flow, can be contoured if desired, to provide a smoother radius of curvature for redirecting the flow in the desired direction.

As shown in FIG. 3, the vane appears as a planar figure having adjacent first and second straight sides 48,68 that meet at the channel corner 46 and extend from the corner in parallel with the respective first and second side walls 42,44. Although not evident in FIG. 3, in this embodiment the bracing portion has orthogonal first and second bracing walls 50,52 which have a common vertically oriented corner cradled in the corner of the channel, and which each extend from a common upstream apex 32 that is remote from the hood portion 66.

Figure 11:
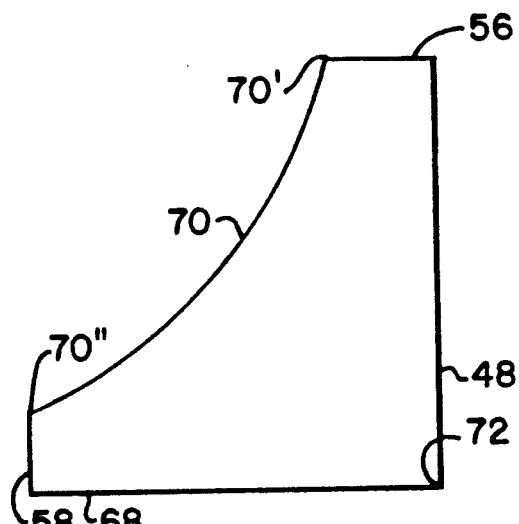
FIG. 11 is a view similar to FIG. 10, showing yet another embodiment of the vane.
Figure 10:
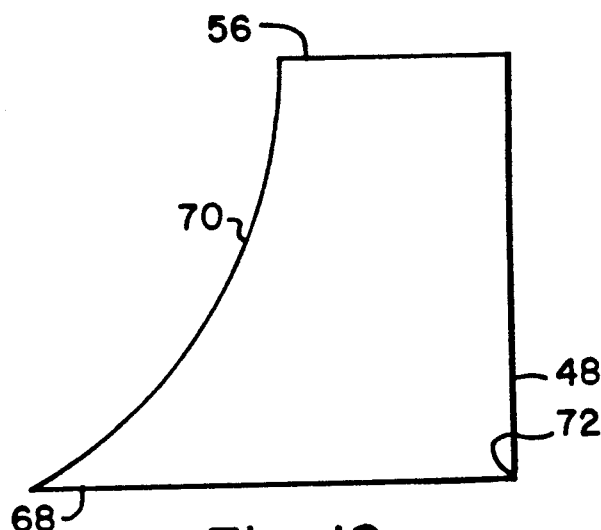
FIG. 10 is a view similar to FIG. 9, showing another form of the vane, which has an arcuate side opposite the included right angle, and a gradual taper from a larger base to a narrower tip.
Figure 9:
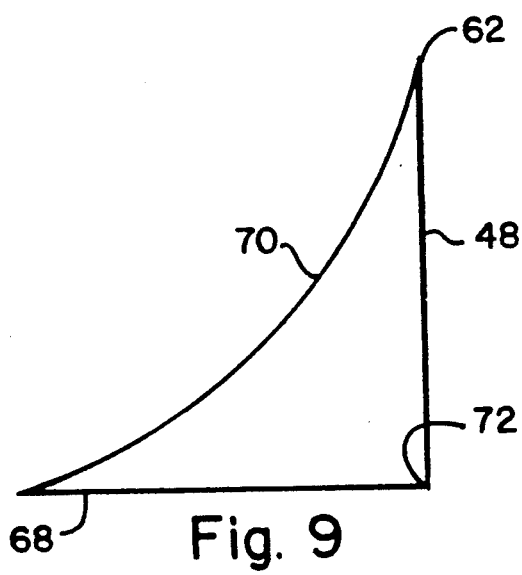
FIG. 9 is a view similar to FIG. 8, wherein the form of the vane is a right triangle having an arcuate side opposite the right angle.
Figure 8:
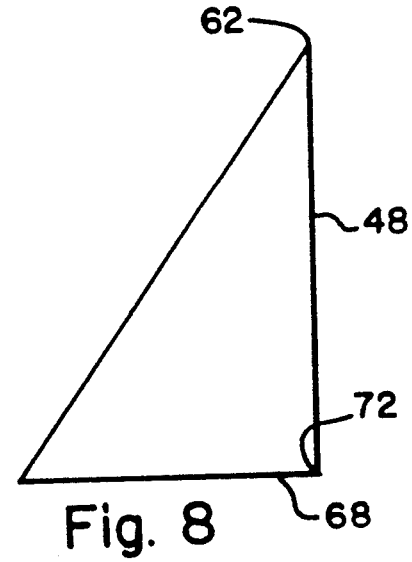
FIG. 8 illustrates a generalized form of the downstream end of the deflector member, as a vane which, when viewed from above the assembly, defines a planar triangular figure.

FIGS. 8-11 show alternative embodiments of the vane 66 as viewed from above the channel. From that viewing position the vane could be a right triangle as shown in FIG. 8, or a right triangle wherein the side opposite the right angle is arcuate, as shown in FIG. 9. Preferably, the radius of curvature of the arcuate portion of the vane, is greater than but concentric with the radius of curvature of the fuel rod that is centered in the channel. In general, however, the vane 66 has a relatively wide base 68 portion at its lower end, with the vane extending obliquely upward above the channel to a relatively narrow but preferably not pointed, tip or peak portion 62. In FIG. 10, it may be seen that the peak portion 62 of the vane may have a straight side 56 that is parallel to the base 68. Finally, as shown in FIG. 11, the preferred shape of the vane as viewed from above, includes a short straight side 58 extending from the base 68 substantially in parallel with the other straight side 48, and the tip 62 has a straight portion 56 extending from the first side 48, in parallel with the second side 68. The straight shorter portions 56,58 are connected by an arcuate side 70 which is supported only by the first and second straight sides 48,68. In other words, in each of the embodiments of FIGS. 8-11, the side 70 opposite the angle 72 in the corner of the channel, is supported only at its ends 70',70". This provides an open region immediately below the vane 66, which acts as a hood to capture and redirect the flow without interference, except as partially guided by the containment wall 48.

I claim:

1. A flow deflector grid for a nuclear fuel assembly, comprising:

a plurality of metal strips which intersect in a regular array to form an egg-crate type lattice, the lattice defining a plurality of coolant flow channels, each channel having sidewalls defined by the strips, a height dimension defined by the height of the strips, a plurality of corners defined by the strip intersections, a channel central axis parallel to the height dimension, and a flow cross section normal to the channel axis for coaxially receiving a fuel rod spaced within the channel sidewalls; and a unitary flow deflector member attached to and situated in the corner of each channel so as to be cradled between first and second sidewalls, the deflector member having a hood portion which projects above the height dimension of the channel and which includes a substantially planar vane extending obliquely upward from said first sidewall and oriented transversely to the channel axis, and a substantially planar flow containment wall extending substantially vertically from said second sidewall to said vane.

2. The grid of claim 1, wherein each deflector member includes a lower, angled bracing portion having a height substantially equal to the height dimension of the channel and being attached to and cradled in said corner of the channel, and said hood portion integrally projects above the bracing portion.

3. The grid of claim 2, wherein the strips intersect orthogonally such that each channel has four sidewalls and a square cross sectional area, and the bracing portion has orthogonal first and second bracing walls which have a common vertically oriented corner cradled in the corner of the channel and which each extend from a common apex remote from the hood portion in parallel along respective first and second sidewalls.

4. The grid of claim 1, wherein the vane of the hood portion when viewed from above the channel, appears as a planar figure including adjacent first and second straight sides that meet at the channel corner and extend from the corner in parallel with the respective first and second sidewalls.

5. The grid of claim 4, wherein the vane has an arcuate side situated opposite the channel corner and defining an edge that is supported only by said first and second straight sides.

6. The grid of claim 5, wherein the vane has a straight edge extending from said second straight side substantially in parallel with the first straight side, and the arcuate side of the vane intersects the straight edge, whereby the vane has a relatively wide base portion at the first sidewall and extends obliquely upward above the channel to a relatively narrow tip portion.

7. The grid of claim 6, further including a cylindrical fuel rod coaxially traversing the channel and wherein the arcuate side of the vane is spaced from the rod and has a curvature that is concentric with the circular cross section of the rod.

8. The grid of claim 4, wherein the vane has a relatively wide base portion at and parallel to the first sidewall and extends obliquely upward above the channel in the general direction of the second sidewall, to a relatively narrow tip portion.

9. A flow deflector grid in a nuclear fuel assembly, comprising:

a plurality of metal strips which intersect orthogonally in northsouth and eastwest orientation to form an egg-crate type lattice, the lattice defining a regular array of coolant flow channels, each channel having four sidewalls defined by a respective four strips, a height dimension defined by the height of the strips, four corners defined by the strip intersections, a channel central axis parallel to the height dimension, and a square flow cross section normal to the channel axis;

a plurality of cylindrical fuel rods traversing and spaced within the sidewalls of a respective plurality of channels;

means projecting from the sidewalls for resiliently centering and supporting a fuel rod coaxially in a respective channel; and one unitary flow deflector member attached to and situated in the northeast corner defined by first and second sidewalls of a given channel, said one deflector member having a hood portion which projects above the height dimension of the channel and which includes a substantially planar vane extending obliquely upward and north to south from said first sidewall and oriented transversely to the channel axis, and a substantially planar flow containment wall extending substantially vertically from said second sidewall to said vane; and another unitary flow deflector member attached to and situated in the southwest corner defined by third and fourth sidewalls, said other deflector member having a hood portion which projects above the height dimension of the channel and which includes a substantially planar vane extending obliquely upward and south to north from said third sidewall and oriented transversely to the channel axis, and a substantially planar flow containment wall extending substantially vertically from said fourth sidewall to said vane.

10. The grid of claim 9, wherein each channel has only two flow deflector members, and substantially each of said deflector members in the north each corners of the channels shares a strip intersection with a deflector member at the south west corner of a diagonally adjacent channel.

11. The grid of claim 9, wherein each channel has only two deflector members, and a particular channel has four diagonally neighboring channels to the north east, south east, south west and north west, respectively, and the strip which defines the first side wall of the particular channel also defines the third side wall of the north east neighboring channel, and the strip that defines the second side wall of the particular channel defines the fourth side wall of the south east neighboring channel.

12. The grid of claim 10, wherein each of the deflector members which shares a particular strip intersection, includes bracing walls which taper to an apex which is welded to the apex of the deflector member with which it shares a strip intersection.

* * * * *

UNITED STATES PATENT AND TRADEMARK OFFICE
CERTIFICATE OF CORRECTION

PATENT NO. : 5,283,821
DATED : February 1, 1994
INVENTOR(S) : Zeses E. Karoutas

It is certified that error appears in the above-indentified patent and that said Letters Patent is hereby corrected as shown below:

Column 8, line 7, "each" should be --east--.

Signed and Sealed this

Third Day of December, 1996

Attest:

BRUCE LEHMAN

*Attesting Officer*  *Commissioner of Patents and Trademarks*